Sept. 9, 1952  A. A. MEDDOCK  2,610,022
CONTROL VALVE WITH FREE POSITION
Filed Aug. 26, 1947
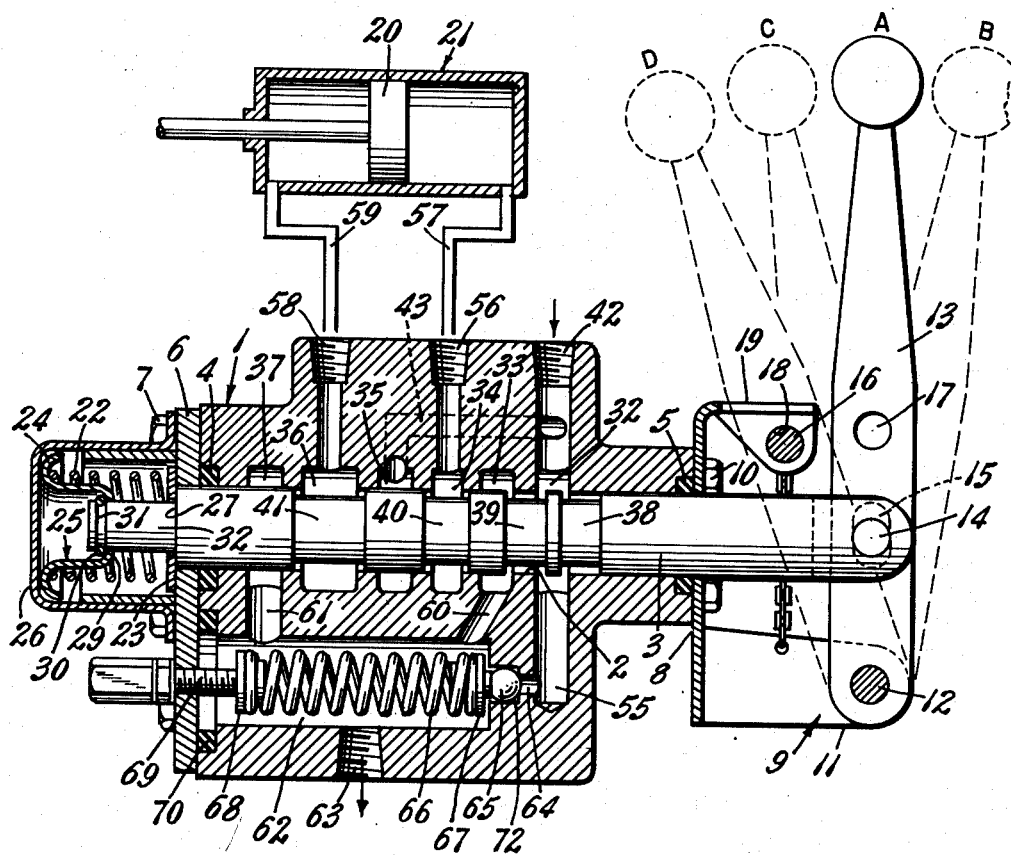
INVENTOR
ALVIN A. MEDDOCK
BY
ATTORNEY Patented Sept. 9, 1952

2,610,022

UNITED STATES PATENT OFFICE 2,610,022

CONTROL VALVE WITH FREE POSITION

Alvin A. Meddock, North Hollywood, Calif., assignor to Bendix Aviation Corporation, South Bend, Ind., a corporation of Delaware Application August 26, 1947, Serial No. 770,643

1 Claim. (Cl. 251—76)

This invention relates to control valves, sometimes referred to as four-way valves, for applying pressure fluid to either end while releasing fluid from the opposite end of a motor cylinder or jack.

An object of the invention is to provide a control valve of simple and practicable construction that will make it possible to release or unlock the jack so that it can be moved freely in either direction by external force when desired.

Another object of the invention is to provide a control valve that not only releases the controlled jack in one position, while locking it in another position, but by-passes pressure fluid past the jack in both of said positions, so that the pump is unloaded without the necessity of employing a separate regulator or unloading valve.

Another object is to provide a quiet relief valve of simple construction.

Still another object is to provide a simple and practicable valve design incorporating a control valve and a relief valve in the same casing.

Other more specific objects and features of the invention will become apparent from the description to follow of a particular embodiment thereof.

The single figure of the drawing shows a valve in accordance with the invention in longitudinal section.

Referring to the drawing, the valve comprises a block or body 1 having a cylinder bore 2 in which is slidably fitted a piston-like valve element 3. The piston is sealed with respect to the cylinder 2 at opposite ends by packing rings 4 and 5 respectively. The packing ring 4 is retained in place by an end closure plate 6 secured to the body 1 as by screws 7. The packing 5 is held in place by a wall 8 of a bracket member 9, the latter being secured to the body 1 as by screws 10. The bracket 9 has an arm 11 to which there is pivotally connected, as by a pivot pin 12, the lower end of a control lever 13. An intermediate portion of the control lever 13 extends through a slot formed in the right end of the valve element 3 and is connected thereby by a pivot pin 14. A slot 15 is formed in the lever 13 for passage of the pin 14. The lever 13 is movable into either a neutral position A shown in full lines, or into any one of three other positions B, C, and D, shown in dotted lines. The lever can be locked in position D, when desired, by means of a removable pin 16 which can be inserted through a hole 17 provided in the lever 13 and a hole 18 provided in an arm 19 of the bracket 9.

The full line position (A) of the lever 13 corresponds to the neutral position of the valve element 3, in which the piston 20 of a controlled hydraulic jack or motor 21 is locked against movement. The valve element 3 is yieldably retained in this position by a helical compression spring 22 which is compressed between a washer 23 lying against the end plate 6, and the outer flange 24 of a collar 25. In the position of the valve shown in the drawing, this collar 25 is held against further movement by a cap 26 which encloses it and is secured by screws 7 to the end plate 6. Leftward movement of the valve element 3 is resisted by the washer 23, which abuts against a shoulder 27 on the valve element. Rightward movement of the valve element 3 is resisted by an inner flange 29 on the retainer 25 which is engaged by a split ring 30 positioned in an annular groove 31 in an extension 32 of the valve element extending beyond the shoulder 27. It will be observed therefore that movement of the valve element 3 in either direction out of the position shown is yieldably resisted by the spring 22.

The bore 2 constitutes a valve chamber containing the valve element 3 and has six annular ports 32, 33, 34, 35, 36, and 37 spaced longitudinally at intervals therealong; these ports are adapted to be interconnected in various ways in various positions of the valve element 3 by annular recesses 38, 39, 40, and 41 therein.

The body 1 is provided with a pump passage 42 adapted to be connected to a hydraulic pump which supplies the pressure fluid for actuation of the jack 21. This pump passage 42 is connected directly to the annular port 32 and to a relief passage 55. The pump passage 42 is also permanently connected through a passage 43 in the body 1 with the annular port 35. Therefore the annular ports 32 and 35 constitute pump ports. The annular port 34 is connected by a passage 56 and a pipe 57 to the right end of the jack 21 whereas the annular port 36 is connected by a passage 58 and a pipe 59 to the left end of the jack 21. The ports 34 and 36 will therefore be referred to as cylinder ports since they communicate with opposite ends of the jack cylinder. The annular port 33 is communicated by a passage 60 and the annular port 37 is communicated by a passage 61 with an elongated, longitudinal extending, passage 62 which is adapted to be connected through a passage 63 with a return pipe for returning fluid to the pump or to a reservoir from which the pump is supplied. Since the annular ports 33 and 37 are in constant communication with the passage 63, they will be referred to as return ports. The relief passage 55 is communicated with the elongated passage 62 by a passage 64, the left end of which constitutes a seat which is normally closed by a ball valve 65 urged into closed position by a helical compression spring 66, the latter being compressed between an end fitting 67 which bears against the poppet 65 and an end fitting 68 which bears against an adjusting screw 69 threaded through the end plate 6.

The ball 65 is located in a counterbore 72 extending from the passage 64, which counterbore has a depth somewhat greater than the diameter of the ball and a diameter only very slightly greater than the ball. Thus, the clearance between the ball and the wall of the counterbore should not exceed about .005 inch where the ball diameter is ⅜, else the valve may chatter and scream in operation. Such chattering is prevented by reducing the clearance around the ball because the latter then acts like a piston in the counterbore 72. The result is that following initial cracking of the ball off its seat, the pressure fluid is applied to the full projected area of the ball and carries it clear of the seat and to the mouth of the counterbore 72, where it remains until the pressure has dropped substantially after which the ball reseats with snap action.

The control valve operates as follows:

In the neutral position A, shown in full lines in the drawing, the valve recess 39 intercommunicates the pump port 32 and the return port 33 so that pumped fluid is freely by-passed through the valve and no pressure is developed. However, in this position, the valve element 3 isolates the cylinder ports 34 and 36 from all the other ports, so that fluid cannot leave either end of the jack 21, and the piston 20 thereof is locked in position.

If the control lever 13 is moved into position B, the recess 39 no longer communicates the pump 32 and the return port 33, and pressure is developed in the pump ports 32 and 35. The pumped fluid cannot escape from port 32, but it can flow from port 35 through the recess 41 into the cylinder port 36 and thence to the left end of the jack 21. At the same time, fluid can exhaust from the right end of the jack 21 through the pipe 57, the passage 56, and the cylinder port 34 through the recess 40 into the return port 33. Therefore, the jack piston 20 will be moved to the right in this position of the valve.

If the valve is moved into position C, the recess 39 no longer communicates the pump port 32 with the return port 33, and the pump port 35 is communicated by recess 40 with the cylinder port 34, whereas the cylinder port 36 is communicated by the recess 41 with the return port 37. Therefore, in this position of the valve, the jack piston 20 is moved to the left.

When the valve is moved into position D, the pump port 32 is communicated with the return port 33 by the recess 38 to permit further by-passing of pumped fluid through the valve. At the same time, the recess 40 communicates the cylinder port 34 with the pump port 35, and the recess 41 communicates the cylinder port 36 with the return port 37. However, since the pump port 32 is communicated with the return port 33, the pressure in ports 35 and 37 is substantially the same and the two are intercommunicated. Therefore there is substantially no pressure differential between opposite ends of the jack 21, and the piston 20 thereof can be moved freely in either direction.

The valve is ordinarily only maintained in position B or position C for a short time while a desired movement of the jack 21 is being effected. Therefore the lever 13 is held in position B or C manually, and when released the valve is restored to the neutral position by the spring 22.

However it is usually desirable to be able to leave the valve in position D while the operator manipulates, manually or otherwise, the mechanism that is connected to the jack 21 for operation thereby. It is because of this, that the special locking means, including the pin 16, is provided for locking the valve in position D when desired.

Except when the valve is in position B or position C, the pump port 32 is always communicated with the return port 33, so that no pressure can be developed in the relief passage 55. It is only when the valve is in position B or C that there is no direct by-pass through the valve from the pump passage to the return passage, and if the pressure should rise to an excessive value while the valve is in this position the relief valve 65 opens to relieve the pressure. The left end of the chamber 62 containing the relief valve spring 66 is closed by the end plate 6 and sealed by a sealing ring 70.

Although for the purpose of explaining the invention, a particular embodiment thereof has been shown and described, obvious modifications will occur to a person skilled in the art, and I do not desire to be limited to the exact details shown and described.

I claim:

A control valve for controlling fluid flow to and from opposite ends of a hydraulic motor cylinder, said valve comprising: a valve chamber having consecutively, from one end to the other thereof, a first supply port, a first return port, a first cylinder port, a second supply port, a second cylinder port, a second return port; a valve element slideable in said valve chamber consecutively in one direction from a first position near said one end of said valve chamber through second and third positions to a fourth position adjacent the other end of said valve chamber, said valve element comprising consecutively from said one end to the other, second, third, fourth and fifth lands defining therebetween recesses of such longitudinal dimensions and spacings relative to said ports in said valve chamber that: in said first position of the valve element said third recess connects said one cylinder port to said first return port, and said fourth recess connects said other cylinder port to said second supply port; in said second position of the valve element said second recess connects said first supply port with said first return port, said third and fourth lands block said first cylinder port, and said fourth and fifth lands block said second cylinder port; in said third position of the valve element said third recess connects said one cylinder port with said second supply port, and said fourth recess connects said other cylinder port with said second return port; and in said fourth position of said valve element said first recess connects said first supply port with said first return port, said second recess connects said first return port with said one cylinder port, and said fourth recess connects said other cylinder port with said second return port.

ALVIN A. MEDDOCK.

REFERENCES CITED

The following references are of record in the file of this patent:

UNITED STATES PATENTS

| Number | Name | Date |
| --- | --- | --- |
| 562,628 | Lester | June 23, 1896 |
| 1,027,061 | Norling | May 21, 1912 |
| 1,775,856 | Hauser | Sept. 16, 1930 |
| 1,999,693 | Hill | Apr. 30, 1935 |
| 2,101,025 | Hunt | Dec. 7, 1937 |
| 2,139,659 | Bijur | Dec. 13, 1938 |
| 2,184,793 | Clench | Dec. 26, 1939 |
| 2,247,141 | Twyman | June 24, 1941 |
| 2,289,567 | Berglund | July 14, 1942 |
| 2,362,944 | Stephens | Nov. 14, 1944 |
| 2,362,945 | Stephens | Nov. 14, 1944 |